UNITED STATES PATENT OFFICE.

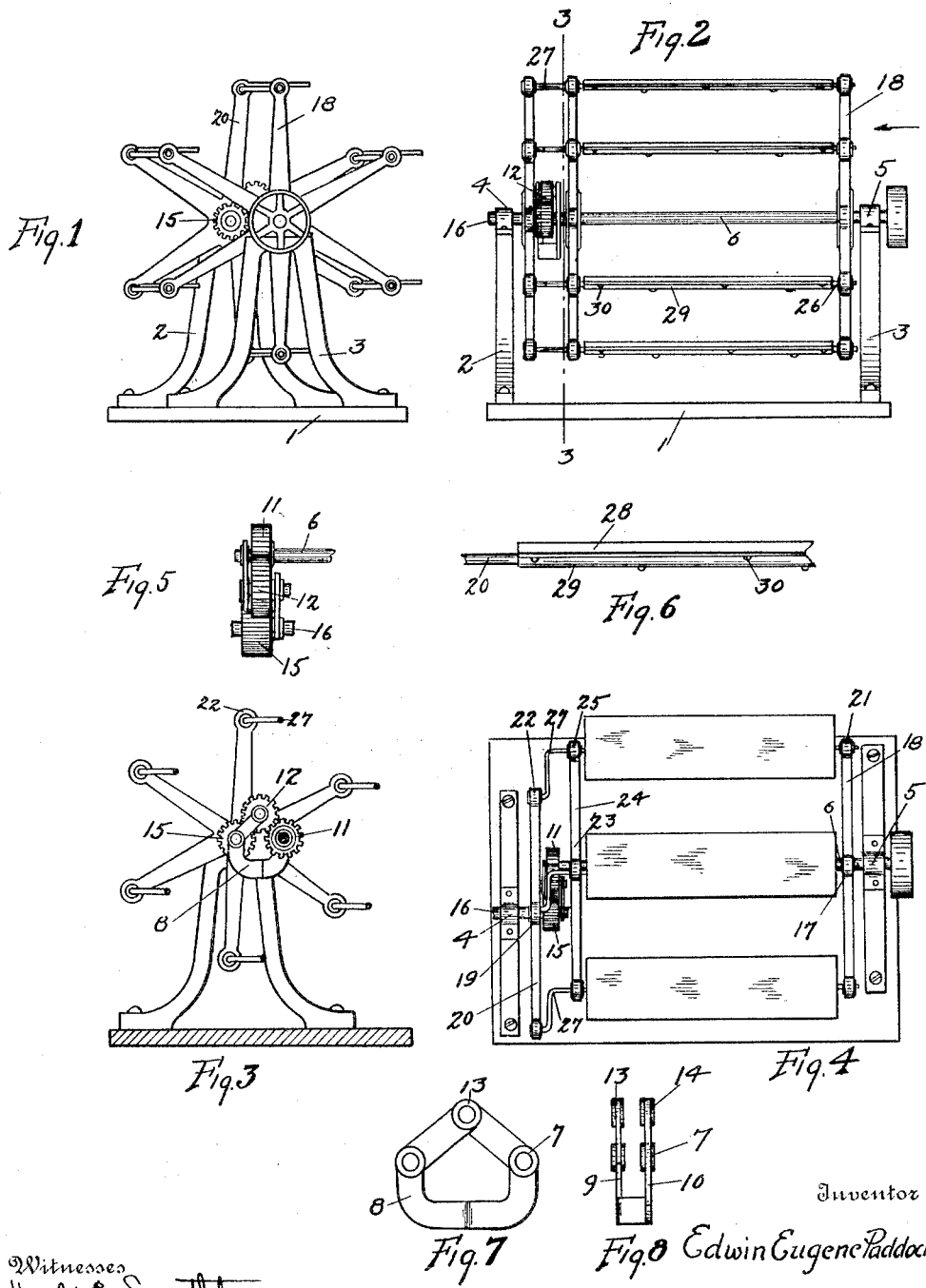

EDWIN EUGENE PADDOCK, OF FARMINGTON, WASHINGTON.

DISPLAY APPARATUS FOR MERCHANDISE.

1,116,616.  Specification of Letters Patent.  Patented Nov. 10, 1914.

Application filed December 31, 1912. Serial No. 739,482.

*To all whom it may concern:*

Be it known that I, EDWIN EUGENE PADDOCK, a citizen of the United States, residing at Farmington, in the county of Whitman and State of Washington, have invented new and useful Improvements in Display Apparatus for Merchandise, of which the following is a specification.

My invention relates to display apparatus for merchandise and has to do with display devices of that character wherein display shelves are mounted on revoluble supporting bodies in such a manner that they will be disposed in a horizontal position throughout rotation of such body.

It is one of the objects of my invention to avoid the gravity or pendently supported shelf and to provide a shelf which is positively held in a horizontal position throughout its bodily rotation about an axis.

The device of my invention will be more fully described in connection with the accompanying drawing and will be more particularly pointed out in and by the appended claims.

In the drawing:—Figure 1 is a view in end elevation of the device of my invention looking in the direction of arrow 1 of Fig. 2. Fig. 2 is a view in side elevation thereof. Fig. 3 is a sectional view on line 3—3 of Fig. 2 looking in the direction of the arrow. Fig. 4 is a plan view. Fig. 5 is a detailed view of a gearing connection shown in Fig. 3. Fig. 6 is a view of one of the shelves and a portion of a rod upon which the shelf is supported. Fig. 7 is a view in side elevation of a bearing bracket. Fig. 8 is an end view thereof.

Like characters of reference designate similar parts throughout the different figures of the drawing.

As illustrated, the device of my invention is mounted upon a base 1 having uprights 2 and 3 in the upper ends of which bearings 4 and 5 are provided, respectively. By reference to Fig. 4 it will be seen that bearings 4 and 5 are offset somewhat with respect to each other, the purpose of which will hereinafter more fully appear. A shaft 6, which is the main operating shaft, is journaled in bearing 5 and extends to and is journaled in bearing 7 of the bracket 8. The bracket 8 is rigidly secured in any desirable manner, and as shown in Fig. 8 is provided with two upright bearing supporting portions 9 and 10. A gear wheel 11 is mounted upon the driving shaft 6 and is disposed between the supporting portions 9 and 10. Gear 11 meshes with a gear 12 which may have a shaft mounted in bearings 13 and 14 of the bracket. Gear 12 meshes with a gear 15 mounted on shaft 16. Shaft 16 is mounted in bearing 4, as shown in Fig. 4.

A wheel frame 17 having spokes 18 is rigidly mounted on shaft 6 adjacent bearing 5. A wheel frame 19, having spokes 20, is rigidly mounted upon shaft 16 adjacent bearing 4. The outer ends of the spokes 18 and 20 are provided with journaled bearings 21 and 22. Adjacent the gearings hereinbefore described, I dispose a third wheel frame 23, on shaft 6, and the same is provided with spokes 24 having terminal bearings 25. The wheel frame 23 is disposed on one side of the gearing connection and the wheel frame 19 on the other side thereof.

Shelf supporting rods 26 extend from the bearings 21, in which they may be loosely mounted, through bearings 25 where they are bent to form cranks 27, the terminals of which are connected or journaled in bearings 22, of the wheel frame 19.

It will be readily seen by reference to Fig. 4 that the wheel frames 23 and 17 are disposed in parallel relation and both rotate about or on shaft 6. Wheel frame 19, mounted on shaft 16 is offset with respect to the axis of rotation of wheel frames 23 and 17 and by reason of the crank connection it will be readily seen that the shelves, or whatever supporting bodies are mounted upon the rods 26, will always be held in a given position thoughout their bodily rotation. The gearing hereinbefore described causes the wheel frames to rotate in predetermined relation with each other when power is applied to the shaft 6.

As illustrated, the display supporting bodies are in the form of shelves 28 which may be provided with sleeves 29 adapted to embrace the rods 26 and secured by screws 30 or the like so that the shelves 28 will be clamped to the rods 26 and prevented from rotating with respect thereto.

It will be obvious from the foregoing description that I have provided display supporting bodies which rotate about an axis and which are positively held in a given position throughout their rotative travel.

While I have herein shown and described one specific embodiment of my invention, I do not wish to be limited thereto except for such limitations as the claims may import.

I claim:—

1. In a display device in combination, a main shaft, wheel frames mounted thereon, rods revolubly carried by said wheel frames, a shelf or goods supporting member rigidly secured to each rod, a second shaft offset with respect to said main shaft, a wheel frame mounted on said second shaft, said rods having crank portions connected with said last named wheel frame, and gearing connecting said main and second shafts to cause rotation thereof in unison, substantially as described.

2. In a display device in combination, a main shaft, wheel frames mounted thereon, rods revolubly carried by said wheel frames, a shelf member rigidly secured to each rod, a second shaft offset with respect to said main shaft, a wheel frame mounted on said second shaft, said rods having cranking portions for connection with said last named wheel frame, and means connecting said main and second shafts to cause the same to rotate in unison, substantially as described.

3. In a display apparatus in combination, a main shaft, a second shaft parallel with said main shaft, gears on said shafts, a substantially U-shaped bracket having journals through which said shafts extend, inwardly and upwardly extending arms carried by said bracket, said arms being offset longitudinally of said shafts and having alined bearings at their upper ends, and a third gear journaled in said last mentioned bearings and meshing with said first mentioned gears.

4. In a display device in combination, a main shaft, wheel frames mounted thereon, rods revolubly carried by said wheel frames, a shelf or goods supporting member rigidly secured to each rod, a second shaft offset with respect to said main shaft and extending parallel with and abreast of said main shaft, gears mounted on said main and second shafts, and intermediate gears meshing with the gears of said shafts, a bearing bracket supporting the adjacent end of said shafts and said gears to cause said shafts to rotate in unison, a wheel frame mounted on said second shaft, and said rods having crank portions for connections with said last named wheel frame, substantially as described.

5. In a display apparatus in combination, a revolubly mounted main shaft, a wheel frame mounted on said shaft, a second shaft parallel with said first mentioned shaft, a frame mounted on said second shaft, devices for supporting goods carried by said frame, gears fixed to said shaft, a bracket member provided with journals embracing said shaft, arms projecting from said bracket member, said arms being integral with said member and each being provided with a journal at its upper end, and a gear pivoted in the journals in said arms and meshing with the gears on said shaft.

In testimony whereof I affix my signature in the presence of two witnesses.

EDWIN EUGENE PADDOCK.

Witnesses:
HAROLD E. SCANTLEBURY,
PAUL B. WARREN.